United States Patent [19]

Strowick

[11] 4,225,184
[45] Sep. 30, 1980

[54] ANCHORING MEANS FOR SAFETY BELTS FOR MOTOR VEHICLE SEATS

[75] Inventor: Willibald Strowick, Remscheid-Lennep, Fed. Rep. of Germany

[73] Assignee: Keiper Automobiltechnik GmbH & Co. KG, Remscheid-Hasten, Fed. Rep. of Germany

[21] Appl. No.: 3,606

[22] Filed: Jan. 15, 1979

[30] Foreign Application Priority Data

Jan. 21, 1978 [DE] Fed. Rep. of Germany ....... 2802617

[51] Int. Cl.² ..................... A62B 35/00; A45D 19/04
[52] U.S. Cl. ................................. 297/468; 248/393; 297/216
[58] Field of Search ...................... 297/385, 216, 468; 280/744; 248/429, 393

[56] References Cited

U.S. PATENT DOCUMENTS

| | | | |
|---|---|---|---|
| 3,186,760 | 1/1965 | Lohr et al. | 297/385 X |
| 3,288,422 | 11/1966 | Krause | 297/385 X |
| 3,424,494 | 1/1969 | McIntyre et al. | 297/385 |
| 3,727,977 | 4/1973 | Gmeiner | 297/385 |
| 3,756,094 | 9/1973 | Mauron | 248/429 X |
| 3,758,158 | 9/1973 | Radke et al. | 297/385 |
| 3,897,101 | 7/1975 | Hess | 297/216 |
| 3,977,725 | 8/1976 | Tengler et al. | 297/216 |

FOREIGN PATENT DOCUMENTS 2634218 7/1976 Fed. Rep. of Germany ........... 297/385

Primary Examiner—James T. McCall
Attorney, Agent, or Firm—Michael J. Striker

[57] ABSTRACT

The anchoring arrangement for safety belts surrounding a vertically and longitudinally adjustable seat in a motor vehicle comprises supporting rail fixedly mounted to the body of the vehicle, a clamping member surrounding the supporting rail and having locking bolts slidably supported on narrow sides of the rail, a swing lever having one arm pivotably connected to the clamping member, a bearing box rigidly connected to the seat and pivotably supporting the fulcrum point of the swing lever, the arm of the swing lever projecting into the bearing box having the form of a gear segment; a first locking pinion is fixedly arranged for rotation in the bearing box and being in mesh with the gear segment, and a second locking pinion supported for rotation at the free end of a splice strap which at its other end is connected to the safety belt; the second pinion being guided in tangential oblong holes in the bearing box and being spring biased to resume a normal position apart from the first locking pinion and in the event when an excessive force is exerted against the safety belt and thus against the splice strap, the second locking pinion is guided in the oblong holes into engagement with the first locking pinion and with the gear segment, thus locking the swing lever to the bearing box and transmitting the pull from the safety belts to the clamping member and causing the locking of the same with the supporting rail.

11 Claims, 5 Drawing Figures

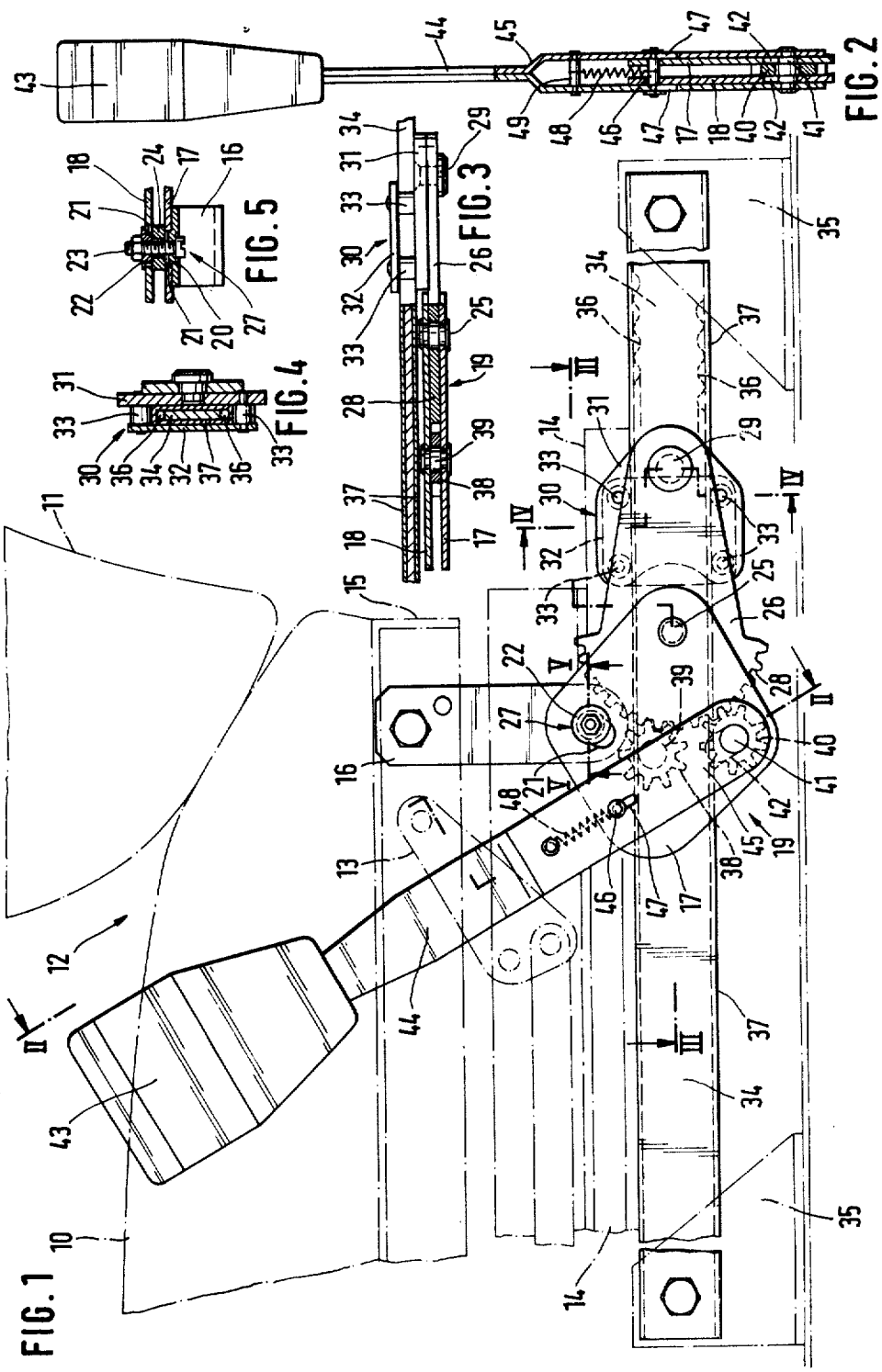

ial position, as the case may be when persons of smaller height use the seat, the locking part of the safety belt remains too far behind the seat and the insertion of the plug into the socket becomes difficult. To avoid this shortcoming, an anchoring mechanism for the seat belt has been developed in which the portion of the seat belt which carries the socket buckle is maintained in a fixed position relative to the vehicle seat irrespective of the adjustment of the latter. In this known construction of the anchoring mechanism the socket buckle of the belt is connected to a clamping member which is shaped as an angular lever and pivotably mounted on the seat. The clamping member has a fork-like guiding portion which engages the supporting beam, the latter being also pivotably mounted on the vehicle body. This supporting beam or rail has on its lower side an arresting rack provided with a lining, the rack in the case of a collision being engageable with an arresting tooth of the clamping member which penetrates the soft, preferably plastic lining of the rack. The pivot point of the socket buckle on the belt and the pivot point of the locking or arresting booth form respectively, end points of the clamping member that is pivotably supported on the seat. The arresting tooth of the clamping member has the form of a bolt which normally slidably rests on the supporting beam when the plug of the safety belt is introduced into a guiding notch of the clamping member. During the position adjustment of the seat the clamping member is displaced on the supporting beam which, according to the position of the seat, is slightly inclined upwardly or downwardly. In this manner the buckle of the belt remains always in the same position relative to the vehicle seat.

ANCHORING MEANS FOR SAFETY BELTS FOR MOTOR VEHICLE SEATS

BACKGROUND OF THE INVENTION

The invention relates to an anchoring mechanism for safety belts and more particularly it relates to such an anchoring mechanism for seat belts which surround a longitudinally and vertically adjustable motor vehicle seat supported on the body of the vehicle. The anchoring mechanism includes a clamping member coupling to one end of the seat belt and being longitudinally displaceable on a supporting beam secured to the body of the vehicle and adapted for arresting the clamping member in the case of a collision.

Belt locking means for safety belts which are not provided in most vehicles include a locking buckle which is adapted for receiving a locking belt plug and which is mounted in a holder, the latter being fixedly attached to the floor of the vehicle. The conventional belt locks which are fixed to the floor of the vehicle maintain their fixed position irrespective of the actual position adjustment of the vehicle seat which apart from the longitudinal position adjustment can also be adjusted vertically. For this reason, in the event that the vehicle seat has been vertically adjusted to its height position and displaced forwardly to its extreme longitudinal position, as the case may be when persons of smaller height use the seat, the locking part of the safety belt remains too far behind the seat and the insertion of the plug into the socket becomes difficult. To avoid this shortcoming, an anchoring mechanism for the seat belt has been developed in which the portion of the seat belt which carries the socket buckle is maintained in a fixed position relative to the vehicle seat irrespective of the adjustment of the latter. In this known construction of the anchoring mechanism the socket buckle of the belt is connected to a clamping member which is shaped as an angular lever and pivotably mounted on the seat. The clamping member has a fork-like guiding portion which engages the supporting beam, the latter being also pivotably mounted on the vehicle body. This supporting beam or rail has on its lower side an arresting rack provided with a lining, the rack in the case of a collision being engageable with an arresting tooth of the clamping member which penetrates the soft, preferably plastic lining of the rack. The pivot point of the socket buckle on the belt and the pivot point of the locking or arresting booth form respectively, end points of the clamping member that is pivotably supported on the seat. The arresting tooth of the clamping member has the form of a bolt which normally slidably rests on the supporting beam when the plug of the safety belt is introduced into a guiding notch of the clamping member. During the position adjustment of the seat the clamping member is displaced on the supporting beam which, according to the position of the seat, is slightly inclined upwardly or downwardly. In this manner the buckle of the belt remains always in the same position relative to the vehicle seat.

In the buckled condition of the seat belt there is still the possibility that during the longitudinal displacement of the vehicle seat in forward direction the clamping member may become locked, particularly when the belt winder is blocked and does not permit unwinding of the seat belt. Moreover, in the case of a collision, the attachment point of the belt buckle to the clamping member moves in a certain range forwardly, this forward movement being caused by the swinging movement of the clamping member on the one hand and by the swinging movement of the supporting beam on the other hand so that the safety belt loop is increased and so increases the danger of injury of the user of the safety belt.

SUMMARY OF THE INVENTION

It is therefore a general object of the present invention to overcome the aforementioned disadvantages.

More particularly, it is an object of the present invention to provide an improved anchoring mechanism for safety belts on motor vehicle seats having longitudinal and vertical position adjusters, in which the locking buckel of the belt maintains a constant position relative to the seat during the position adjustment of the latter whereas in the event of a collision excessive pulling forces exerted against the locking buckle are intercepted by the body of the vehicle without causing a noticeable increase of the safety belt loop due to locking movement of the anchoring mechanism.

In keeping with these objects, and other which will become apparent hereafter, one feature of the invention resides, in an anchoring mechanism for safety belts of an adjustable motor vehicle seat, in a combination which comprises a supporting beam secured to the body of the vehicle, a clamping member engaging the supporting beam, a swing lever pivotably supported on a bearing box which is secured to the seat, one arm of the swing lever being pivotably connected to the clamping member and the other arm being provided with a gear segment, and two locking members in mesh with the gear segment, one locking member being supported for rotation on the bearing box and the other locking member being supported for rotation in a splice strap whereby at normal operation of the safety belt the two locking members are out of engagement from each other whereas during a collision the two locking members engage each other and firmly connect the safety belt via the swing lever and the clamping member to the supporting beam. By virtue of the interconnected swing lever hinged to the clamping member and to the bearing box which in turn is linked to the vehicle seat and arrestable by the locking members when excess acceleration forces act against the safety belt, it is possible to achieve an unobstructed position adjustment of the vehicle seat during which the locking buckle of the safety belt remains in a substantially constant position relative to the seat. The swing lever is hinged both to the bearing box and to the clamping member and consequently during the lifting or lowering of the seat together with the bearing box connected thereto the swing lever can move in such a manner that the clamping member normally maintains its unlocked position relative to the supporting beam and can be longitudinally displaced on the latter. As a result, both the vertical and the longitudinal position of the seat can be adjusted and at the same time the position of the locking buckle of the safety belt remains substantially constant with respect to the seat. In the case of a collision the locking mechanism provides a rigid connection between the bearing box and the swing lever, the hinge point of the swing lever on the clamping member is urged out of its normal position relative to the supporting beam and consequently the clamping member is arrested on the supporting beam. This arresting is affected immediately upon a very short displacement of the locking mechanism on the bearing box so that in the case of a collision the safety belt loop increased only insignificantly and the danger of injury of the user of the safety belts is not increased.

In the preferred embodiment of this invention the locking mechanism for anchoring means of this invention which is arranged on the bearing box consists of two pinions normally spaced apart a small distance from one another and being in mesh with a gear segment provided on one arm of the swing lever. One of the pinions is fixedly supported for rotation in the bearing box whereas the other pinion is fixedly supported for rotation at the end of a splice strap which is firmly connected to the buckle of the safety belt and guided in two oblong holes provided in the bearing box and extending substantially tangentially to the gear segment so that the corresponding pinion is movable concentrically about the pivot point of the swing lever in the bearing box. In this manner it is insured that on occurrence of jerky pulling forces acting against the buckle of the safety belt the pinion rotatably mounted in the splice strap connected to the belt buckle, is guided in the oblong holes in the bearing box to engage the teeth of the other pinion rotatable on the bearing box. Consequently, any rotational movement of the two meshing pinions which at the same time are in mesh with the gear segment of the swing lever, is arrested. In this manner the pinions acting as arresting members in the case of a collision of the vehicle, insure a rigid connection between the swing lever, the bearing box and the seat.

To create a stable bearing support for the pinions which act as the arresting members as well as a bearing support for the swing lever, the bearing box in the preferred embodiment of this invention is assembled of two facing bearing plates spaced apart about a fixed distance and holding in position the pivot pin for the swing lever and having the two oblong holes for accommodating the pivot axle of the movable pinion in the splice strap of the belt buckle whereby both pinions and the gear segment at the end of one arm of the swing lever are arranged between the two bearing plates.

According to still another feature of this invention, the supporting beam for the clamping member is in the form of an elongated flat rail which at both ends thereof is rigidly connected to the body of the vehicle in order to counteract the excessive pulling forces exerted against the safety belts in the case of a collision. The clamping member which pivotably supports the other arm of swing lever projecting from the bearing box surrounds the supporting rail and is movably guided thereon by means of clamping bolts resting on both opposite narrow sides of the flat rail.

In order to ensure a trouble-free guiding of the clamping member on the supporting rail during the position adjustment of the seat, according to another feature of this invention the clamping member is assembled of two facing plates connected one to another by a pair of spacing bolts arranged in sliding contact with respective narrow sides of the supporting rail whereby one of the plates of the clamping member pivotably supports the assigned arm of the swing lever.

In this manner the manufacture as well as the assembly of the anchoring devices of this invention is simplified inasmuch as it employes similar component parts. The increased reliability of the arresting action of the two pinions meshing with the gear segment on the swing lever results from the fact that the distance of the centers of rotation of respective pinions relative to the center of rotation of the swing arm remains constant while the distance between the centers of rotation of the two pinions is variable.

According to still another feature of this invention which provides for reliable arresting movement of the arresting pinion supported for rotation in the splice strap as well as a reliable disengaging of the arresting pinion from its resting position during the adjustment of the seat, the axle of the arresting pinion which is supported for rotation in the splice strap is guided in oblong holes formed in the plates of the bearing box and extending substantially tangentially to the periphery of the gear segment of the swing lever whereby a tension spring positioned between the splice strap and the bearing box keeps normally the arresting pinion out of engagement from the other pinion which is firmly supported for rotation in the bearing box. The splice strap connected to the end of the buckle is preferably made of two angular straps defining a fork-like end position for accommodating the bearing box, the fork being also provided with two oblong holes for guiding the axle of the arresting pinion.

According to still another feature of this invention, the two facing plates of the bearing box are connected by a spacing bolt, the both ends of which project into oblong holes provided in the fork-like end of the splice strap and extending in the longitudinal direction of the latter. In this manner the splice strap is reliably guided in a predetermined tangential direction relative to the periphery of the gear segment of the swing lever. The spacing bolt in the bearing box serves simultaneously for engaging one end of the biasing spring which at the other end thereof is connected to a corresponding spacing bolt provided between the prongs of the fork-like end of the splice strap.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side view of anchoring device for safety belt according to this invention in connection with a longitudinally and vertically adjustable vehicle seat indicated in dash and dot lines;

FIG. 2 is a sectional front view of a splice strap connected to a locking buckle of a safety belt, taken along the line II—II of FIG. 1;

FIG. 3 is a top view, partly in section of the linkage between a bearing box, a swing lever and a clamping member supported for movement on a stationary supporting rail, taken along the line III—III of FIG. 1;

FIG. 4 is a sectional front view of the clamping member hinged to one arm of the swing lever and supported on a supporting rail, taken along the line IV—IV of FIG. 1; and FIG. 5 is a sectional rear view of the connecting strap between the bearing box and the seat, taken along the line V—V of FIG. 1.

DESCRIPTION OF THE PREFERRED EMBODIMENTS

In the example as illustrated in the Figures, a seat 12 consisting of a seat part 10 and a backrest part 11 has a lower seat frame 15 which is laterally hinged to one arm of a pivotable connecting piece 13 which is supported for rotary movement on an arrangement of guiding rails 14. The guiding rails 14 are longitudinally adjustable and the pivotable connecting piece provides for vertical adjustment of the seat 12. The anchoring device for seat belts according to this invention includes a downwardly projecting, connecting strap 16 which is fixedly mounted to the seat supporting frame 15, preferably by bolts and pin fittings. The lower end of the mounting strap 16 is firmly connected to two facing plates 17 and 18 forming together a bearing box 19. For the sake of simplified manufacture of bearing plates 17 and 18 the latter have symmetrically arranged cutouts whereby a depressed portion 20 of connecting strip 16 fits in a cutout 21 in bearing plate 17. Similar cutout 21 is provided in the opposite bearing plate 18 to receive a stepped plate 22. The depressed portion 20 as well as stepped plate 22 rest on a spacing collar 24 and are clamped together by fastening screw 23. The resulting connection point 27 holds the bearing box 19 in a fixed position relative to the connecting strap 16 and thus to the seat frame 15. An axle bolt 25 is riveted between the bearing plates 17 and 18 and forms therebetween a pivot axle for swing lever 26. One arm of the lever 26 which projects between the bearing plates 17 and 18 has the form of a gear segment 28 the semi-circular periphery of which is concentric with the pivot axle 25. The other arm of swing lever 26 projecting rearwardly from the bearing box 19 is hinged by means of a pivot pin 29 to a clamping member 30. The clamping member is assembled of two facing plates 31 and 32 which in the shown embodiment are mutually connected by two pairs of spacing bolts 33 which are riveted to respective clamping plates 31 and 32 and keep the latter in a fixed spaced relationship relative to each other. Each pair of spacing bolts 33 is arranged above an assigned narrow side of a supporting beam 34 and are dimensioned such as to keep the clamping plates 31 and 32 with a small play in contact with the broad sides of the supporting beam 34. The supporting beam 34 is in the form of a flat rail, the both ends of which are fixedly connected to vehicle body 35. Preferably, the narrow sides of the supporting rail are provided with arresting teeth 36 which, in the case of a collision of the vehicle serve for engaging the spacing bolts 33 of the clamping member thus arresting the clamping member in a fixed position. This tooth profile 36 may be provided on one narrow side of the supporting rail 34 only. In order that the arresting teeth 36 present no obstacle for the sliding movement of the clamping bolts 33 of clamping member 30, the steel rack of the rail, as seen particularly from FIGS. 1 and 4, is covered with a lining 37 of a crushable or pliable material which in the event of a collision of the car permits the engagement of spacing bolts 33 with the arresting teeth 36.

In the preferred embodiment of this invention the bearing plates 17 and 18 support for rotation on a fixed spacing axle 39 a toothed pinion 38 which is in mesh with the gear segment 28 of swing lever 26. At a relatively small distance from the fixedly supported pinion 38, another pinion 40 is arranged for rotation in the interspace between bearing plates 17 and 18 and is also in mesh with the gear segment 28. In contrast to the pinion 38, pinion 40 has an axle 41 which is guided in two opposite oblong holes 42 provided in respective bearing plates 17 and 18. The axle 41 of pinion 40 is guided substantially concentrically to pivot axle 25 of swing lever 26 and is movable towards pinion 38. Accordingly, under normal conditions the displaceable pinion 40 is supported for rotation at one end of the curved oblong hole 42 and being in mesh with the gear segment 28 of swing lever 26 but out of engagement from the teeth of the other pinion 38 which as mentioned above, is rotatable on a fixedly mounted axle 39. In the event, however, that the displaceable pinion 40 is moved in hole 42 into engagement with the teeth both of pinion 38 and of gear segment 28, the pinions 38 and 40 act as an arresting mechanism.

The projecting ends of axle 41 of pinion 40 are secured to the arms of a fork-like end portion of splice strap 44. The other end of strap 44 is secured to the buckle 43 of a safety belt. In order to adjust the movement of splices strap 44 to the arcuate movement of pinion 40 whose axle 41 is fixedly riveted to the splice strap and guided in the aforementioned arcuate oblong holes 42 in the bearing box 19, a spacing bolt 46 is arranged between the bearing plates 17 and 18 whereby the ends of the spacing bolt protrude laterally from the bearing box 19. These protruding end portions of spacing bolt 46 pass through opposite oblong grooves 47 in the arms of the fork-like end portion 45 of splice strap 44 and extend in the longitudinal direction of the splice strap. The intermediate part of spacing bolt 46 engages one end of a tensioning spring 48 which at its other end is suspended on a spacing bolt 49 between the arms of the fork 45 of splice strap 44. This tensioning spring 48 urges splice strap 44 and thus the axle 41 of pinion 40 into abutment against the lower end of the arcuate oblong hole 42 in bearing box 19 so that under normal condition the pinion 40 is out of engagement from the other pinion 38. The strength of tensioning spring 48 is adjusted such that it is substantially smaller than inertial forces acting against safety belts in the case of a collision.

During the longitudinal adjustment of the position of seat, bearing box 19 which is rigidly connected to seat supporting frame 15, is also longitudinally displaced in the same direction and also displaces via swing lever 26 the clamping member 30 on supporting rail 34. In the case of a vertical position adjustment of seat 12 the bearing box 19 is correspondingly vertically adjusted via the connecting strap 16 whereby the pivot axle 25 of swing lever 26 is lifted or lowered in accordance with the direction of adjustment. Clamping member 30, however, maintains the same vertical position relative to the stationary supporting rail 34 and consequently swing lever 26 pivots about its center axis 25 whereby pinions 38 and 40 are rotated by gear segment 28; in addition, swing lever 26 pivots about the pivot pin 29 on clamping member 30. The pivotable connection of swing lever 26 about the pivot 29 compensates the resulting shorter or longer horizontal distance between the pivot pin 25 and the pivot pin 29 resulting from the vertical adjustment of seat 10, by sliding the clamping member 30 on supporting beam 34. During this sliding movement of clamping member 30 belt buckle 43 as well as the splice strap 44 connected thereto maintain a constant relative position with respect to the seat 12. In the event that due to an accident for example an excessive pulling force is exerted against belt buckle 43, the splice strap 44 together with toothed pinion 40 which is pivotably supported thereon, are pulled upwardly until the pinion 40 engages the pinion 38 in bearing box 19. Due to this locking engagement, the movement of swing lever 26 is arrested with respect to bearing box 19 so that splice strap 44, bearing box 19 and swing lever 26 from a rigid unit and by slightly deforming the connecting strap 16, the rigid unit pulls the pivot pin 29 upwardly and thus imparts a pivotal movement to clamping member 30. This pivotal movement results in a locking of the clamping member 30 on the supporting beam 34. Under strong pulling force of belt buckle 43 the lining 37 on the teeth of supporting beam 34 is depressed whereby two of the four clamping bolts 33 engage teeth 36 of supporting beam 34. In this manner the pulling force acting against the safety belts in the case of a collision is transmitted via the supporting beam 44 to the body 35 of a vehicle.

It will be understood that each of the elements discussed above, or two or four together, may also find a useful application in other types of constructions differing from the types described above.

While the invention has been illustrated and described as embodied in a specific example of anchoring arrangement for safety belts in adjustable vehicle seats, it is not intended to be limited to the details shown, since various modifications and structural changes may be made without departing in any way from the spirit of the present invention. For example, instead of two pinions 38 and 40 it is also possible to imploy wedge-like or conical arresting members cooperating with a smooth segment of the swing lever 26 (without teeth) so that the swing lever is arrested by frictional forces only. Furthermore, connecting step 16 can be simply welded to bearing box 19 to provide a rigid connection therebetween.

Without further analysis, the following will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An anchoring arrangement, for safety belts of an adjustable seat in a vehicle, comprising: a supporting rail fixedly mounted to the body of the vehicle; a clamping member surrounding the supporting rail and being movably supported thereon; a bearing member rigidly connected to the seat and supporting a first arresting member; a swing lever pivotably supported on said bearing member and having one arm in sliding contact with said first arresting member and the other arm pivotably connected to said clamping member; a strap connected to said safety belt; a second arresting member connected to said strap and being movably arranged in said bearing member, said second arresting member being normally held in a position apart from said first arresting member while during an excessive pull imparted to the safety belt is brought into engagement with said first arresting member and with said one arm of said swing lever to form therewith a rigid unit which transmits the excessive pull to the clamping member and locks the same on said supporting rail.

2. The anchoring arrangement as defined in claim 1, wherein said one arm of said swing lever is in the form of a gear segment, said first locking member being in the form of a toothed pinion supported for rotation on said bearing member and being in mesh with said gear segment, said second arresting member being in the form of a second toothed pinion supported for rotation in said strap and being in mesh with said gear segment, said bearing member having oblong holes for guiding said second pinion in tangential direction relative to said gear segment to engage said first pinion.

3. The anchoring arrangement as defined in claim 2, wherein the bearing member is assembled of two facing bearing plates spaced apart from one another by means of a spacing bolt and a pivot pin for said swing lever, said gear segment and said pinions being arranged between said bearing plates.

4. The anchoring arrangement as defined in claim 3, further including a connecting strap rigidly secured at one end thereof to said seat and projecting with the other end thereof between said bearing plates and being secured thereto by means of said spacing bolt.

5. The anchoring arrangement as defined in claim 1, wherein said supporting rail is a flat rail defining two opposite narrow sides, both ends of said rail being rigidly connected to the bottom of the vehicle body, said clamping member including two pairs of locking bolts slidably supported on respective narrow sides of said supporting rail.

6. The anchoring arrangement as defined in claim 5, wherein the other arm of said swing lever is pivotably connected to one side of said clamping member facing the broader side of said supporting rail.

7. The anchoring arrangement as defined in claim 5, wherein said clamping member is assembled of two plates facing respectively the broader sides of said supporting rail, said locking bolts connecting said plates and acting as spacing members therefore, said other arm of said swing lever being pivotably connected to one of said plates.

8. The anchoring arrangement as defined in claim 1, wherein the distance of said first and second locking members from the pivot point of said swing lever on said bearing member is constant and the distance of said locking members relative to each other is variable.

9. The anchoring arrangement as defined in claim 2, wherein said splice strap connected to said safety belt is guided on said bearing member in tangential direction relative to said gear segment of said swing lever and is spring biased to resume a position in which the second pinion supported for rotation thereon is spaced apart from said first pinion fixedly supported for rotation on said bearing member.

10. The anchoring arrangement as defined in claim 9, wherein said splice strap has a fork-shaped end portion surrounding said bearing member, said forkshaped portion including guiding grooves, said bearing member having projecting end portions engaging said guiding grooves, said second pinion being arranged in said forklike portion.

11. The anchoring arrangement as defined in claim 10, wherein said additional spacing bolt in said bearing member engages one end of a biasing spring, the other end of said biasing spring being attached to said splice strap to urge the same into a position in which said second locking pinion is out of engagement from said first locking pinion.

* * * * *